(12) United States Patent
Tsai et al.

(10) Patent No.: US 9,030,044 B2
(45) Date of Patent: May 12, 2015

(54) METHODS AND CIRCUITS FOR POWER SWITCHING

(75) Inventors: Chih-Fu Tsai, Kaohsiung County (TW); Kuo-Sheng Chung, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 839 days.

(21) Appl. No.: 13/190,336

(22) Filed: Jul. 25, 2011

(65) Prior Publication Data

US 2012/0025612 A1 Feb. 2, 2012

(30) Foreign Application Priority Data

Jul. 27, 2010 (TW) .............................. 099124681 A

(51) Int. Cl.
*H02J 4/00* (2006.01)
*H02J 9/00* (2006.01)
*H02J 9/06* (2006.01)

(52) U.S. Cl.
CPC . *H02J 9/005* (2013.01); *H02J 4/00* (2013.01); *H02J 9/061* (2013.01)

(58) Field of Classification Search
CPC .......................................................... H02J 4/00
USPC .......................................................... 307/52
See application file for complete search history.

(56) References Cited

U.S. PATENT DOCUMENTS 5,635,772 A * 6/1997 Lagree et al. .................. 307/64

FOREIGN PATENT DOCUMENTS

| CN | 1989467 A | 6/2007 |
|---|---|---|
| CN | 2938529 Y | 8/2007 |
| CN | 101795070 A | 8/2010 |
| CN | 201601534 U | 10/2010 |
| JP | 10304598 | 11/1998 |
| JP | 2009232521 A | 10/2009 |
| TW | I279955 B | 4/2007 |
| TW | 200935698 A | 8/2009 |
| TW | 201005465 A | 2/2010 |
| TW | I325207 B | 5/2010 |

OTHER PUBLICATIONS

State Intellectual Property Office of the People's Republic of China, "Office Action", China, Dec. 13, 2013.
Intellectual Property Office, Ministry of Economic Affairs, R.O.C., "Office Action", Mar. 6, 2014, Taiwan.

* cited by examiner

*Primary Examiner* — Hal Kaplan
(74) *Attorney, Agent, or Firm* — Tim Tingkang Xia, Esq.; Morris, Manning & Martin, LLP

(57) ABSTRACT

The present invention relates to a method and a circuit for power switching. The method comprises the steps of: providing a operation circuit; receiving a command from a Host and setting up a power mode of the operation circuit; supplying a first rated consuming power source and then a second rated consuming power source to the operation circuit via the power switching circuit according to power mode; detecting the transferring process form the first rated consuming power source to second rated consuming power source; and preventing over current according to detecting result.

10 Claims, 4 Drawing Sheets

METHODS AND CIRCUITS FOR POWER SWITCHING

CROSS-REFERENCE TO RELATED APPLICATIONS

This non-provisional application claims priority under 35 U.S.C. §119(a) on Patent Application No. 099124681 filed in Taiwan (R.O.C.) on Jul. 27, 2010, the entire contents of which are hereby incorporated by reference.

BACKGROUND OF THE INVENTION

1. Field of the Invention

The present invention relates to a method and a circuit for power switching, more particularly, a method and a circuit for seamless power switching, which is used to save chip power-consumption and protect related circuits.

2. Description of the Prior Arts

On the premise of environment protection, saving power is inevitable with the uprising need for it in electrical equipment. The power supply element has optimal power supply range for corresponding different requirements of power consumption, and the power supply element also may set function of saving power according to the requirements of function.

The setting of electricity-saving function is divided to two types: power setting and non-power setting. The early saving power mechanism is mainly based on the non-power setting, for example, clock division, decreasing or shutoff clock; the modern saving power mechanism is mainly based on power setting, for example, power division, lowering voltage, or shutoff power. However, this setting of electricity-saving function still has some localization.

Accordingly, in view of the above drawbacks, the inventor of the present application provides two different rated consuming power sources according to chip operation, and the chip is switched to low power consumption output source for saving power when the low power consumption is required. However, the circuit must keep in normal operation (seamless power supply) when the different sources are alternately switched, resulting in it is difficult to maintain the voltage level and switch smoothly, and the large current generated will damage the power supply elements.

Moreover, in view of the above drawbacks, the present invention further provides a method and a apparatus for power switching, more particularly, a method and a circuit for seamless power switching, which is used to save chip power-consumption and protect related circuits, improves some problems, such as overcurrent generated from power switching will damage the power supply chips or the bias sources.

SUMMARY OF THE INVENTION

According to one object of the present invention, the present invention provides a method and a circuit for power switching to use different power supply elements to provide power that the chip needs for achieving to save power and protecting the circuit when the chip needs to consume different power.

According to another object of the present invention, the overcurrent will not be occurred when the chip needs to consume different power, and meanwhile, the seamless process is performed on the different power supply elements switched.

According to one embodiment, the present invention provides a method for power switching, comprising: providing an operation circuit; receiving an instruction from a Host and setting up a power mode of the operation circuit; supplying a first rated consuming power source first and then supplying a second rated consuming power source to the operation circuit via the power switching circuit according to the power mode; detecting a process of switching the first rated consuming power source to the second rated consuming power source for generating a detecting result; and preventing overcurrent according to detecting result.

According to another embodiment, the present invention provides a power switching circuit configured to switch consuming power source of a operation circuit, comprising: a first regulator, for receiving a first rated consuming power source so as to provide a first steady voltage to the operation circuit; a second regulator, for receiving a second rated consuming power source so as to provide a second steady voltage to the operation circuit; a first overcurrent protector, coupled to the first regulator, for detecting a output current from the first regulator, and outputting a first control signal when the output current is larger than a first threshold value; a second overcurrent protector, coupled to the second regulator, for detecting a output current from the second regulator, and outputting a second control signal when the output current is larger than a second threshold value; and a control circuit, for receiving the first and second control signals and feeding back the first and second control signal to prevent the overcurrent generated from the first regulator and the second regulator.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as the follows.

Figure 1:
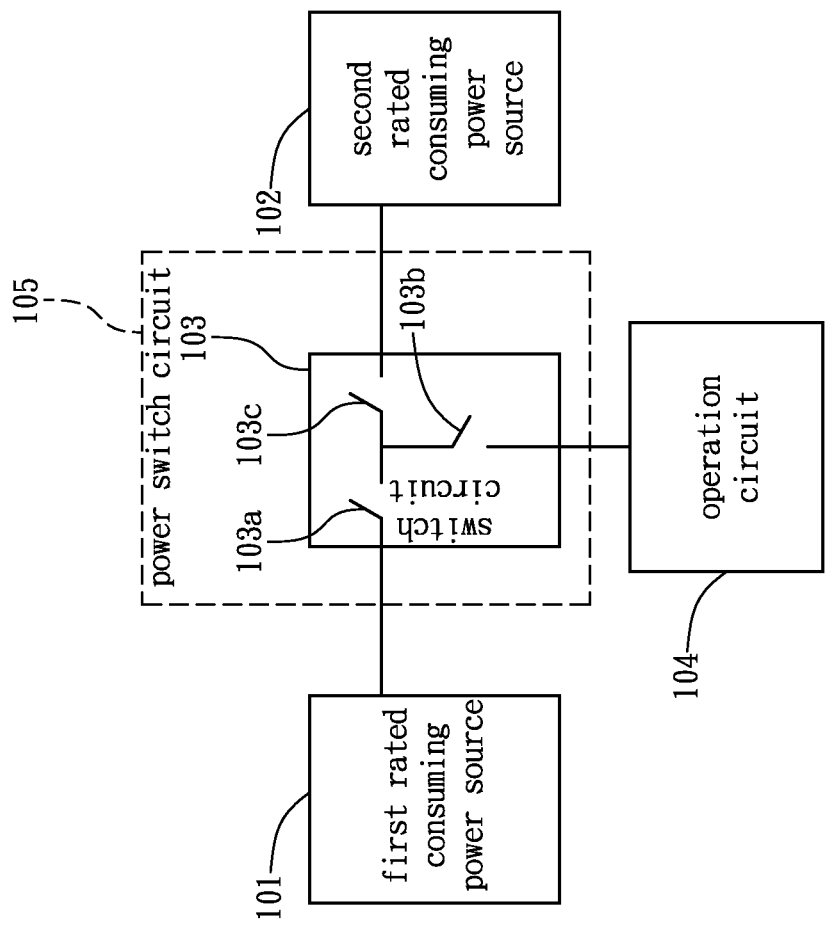
FIG. 1 illustrates a schematic diagram of a power switch circuit according to one embodiment of the present invention.

FIG. 1 illustrates one embodiment of the present invention, which comprises a first rated consuming power source 101, a second rated consuming power source 102 and a power switching circuit 105 with protection function used for providing a power source to a operation circuit 104. Specifically, the power switching circuit 105 comprises a switch circuit 103. A rated consuming current of the first rated consuming power source 101 may be 800 ma, and is used when the operation circuit 104 needs a lager power source. A rated consuming current of the second rated consuming power source 102 may be 100 ma, and is used when the operation circuit 104 needs a smaller power source. Thereby, the first rated consuming power source is switched to the second rated consuming power source when the power source that the operation circuit 104 needs from the large power source to the small power source. Or perhaps the second rated consuming power source is switched to the first rated consuming power source when the power source that the operation circuit 104 needs from the small power source to the large power source. Actually, the voltage level of the bias source provided by the first rate consuming power source 101 may be same as the voltage level of the bias source provided by the second rated consuming power source 102, for example, 3.3V (or 5V, 2.5V). However, the bias source provided by the first rated consuming power source may be 3.4V and the bias source of the second rated consuming power source 102 may be 3.15V because the circuit difference. When power sources are alternately switched, the large current is generated between the power sources or the operation circuit if on-state between the first and second rated consuming power sources or the power sources are provided by both of them. The voltage level of the bias source provided by the first rated consuming power source is distinctly from the second rated consuming power source, and the bias source is transferred to a voltage level that the operation circuit 104 needs by the rear stage circuits (for example, low drop-out (LDO)). During the switch process from the first rated consuming power source to the second rated consuming power source, the switch circuit 103 including a first switch 103a, a second switch 103b and the third switch 103c is used for avoiding the large current generated to damage the first rated consuming power source 101, the second consuming power source 102 or the operation circuit 104, and the embodiments is illustrated as follow.

Firstly, the operation circuit 104 uses first rated consuming power source to provide the power source via the first switch 103a and the second switch 103b in the power switch circuit 105. Meanwhile, the first switch 103a is on, the second switch 103b is on and the third switch 103c is off.

Subsequently, it will causes that the first and second rated consuming power sources 101, 102 simultaneously provide the power to the operation circuit when the first switch 103a is on and the third switch 103c is transferred form off to on. If the voltage level of the first rated consuming power source 101 and the second rated consuming power source 102 are not consistent, the power supply elements with high voltage level not only provide the power to the operation circuit 104, but also provide the current to the power supply elements with low voltage level. Furthermore, it will damage the related elements when the first and second rated consuming power source 101, 102 simultaneously provide the power to the operation circuit.

The power switch circuit 105 may include a protection circuit (not shown in) for detecting the overcurrent. The protection circuit is not operated before the large current is occurred and meanwhile, the switch coupled to the consuming power source is turned off; and the protection circuit automatically turns off the switch coupled to the consuming power source before the large current is occurred and meanwhile, the switch coupled to the consuming power source is not turned off.

The power switch circuit 105 may control to turn off one of the first switch 103a, the second switch 103b and the third switch 103c. Therefore, it may ensure that the operation circuit 104 may normally operate in the switch process, and the large current will also not damage the elements in the first or second rated consuming power source or the elements in the operation circuit 104.

Figure 2:
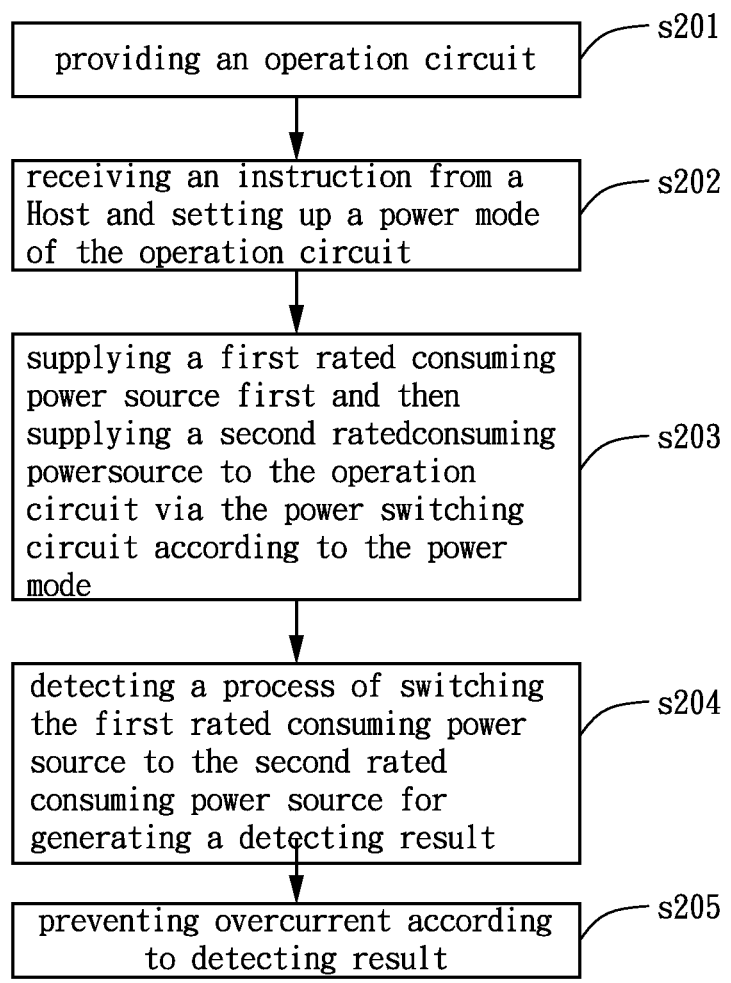
FIG. 2 illustrates a flow chart of method for power switching.

FIG. 2 illustrates a method for power switching according to embodiment of the present invention, which is used for saving chip power-consumption, and the steps comprises:

S201: providing a chip (for example, the operation circuit 14);

S202: receiving an instruction from a Host and setting up a power mode of the operation circuit;

S203: supplying a first rated consuming power source first and then supplying a second rated consuming power source to the operation circuit via the power switching circuit according to the power mode;

S204: detecting a process of switching the first rated consuming power source to the second rated consuming power source for generating a detecting result; and S205: preventing overcurrent according to the detecting result, wherein, in the step of S203, a power switching from the first rated consuming power source to the second rated consuming power source is seamless.

Specifically, the power switching circuit may comprise a regulator and an overcurrent protector. The regulator is a low drop-out (LDO) regulator, and wherein the regulator is used for receiving a first or second rated consuming power source to generate a first or second steady voltage, and then output the first or second steady voltage to the operation circuit 14.

The method for power switching used for saving chip power-consumption further comprises: the first switch receives the command from the control circuit so as to instruct the first rated consuming power source to stop providing a power source or a current from the first rated consuming power source to the second rated consuming power source or the chip when the overcurrent is occurred from the first rated consuming power source.

The method for power switching used for saving chip power-consumption further comprises: the second switch receives the command from the control circuit so as to instruct the second rated consuming power source to stop providing a power source or a current from the second rated consuming power source to the first rated consuming power source or the chip when the overcurrent is occurred from the second rated consuming power source.

The method for power switching used for saving chip power-consumption further comprises: transmitting a control signal to stop providing a power source or a current from the first rated consuming power source when currents from the first and second rate consuming power sources are simultaneously provided to the operation circuit and the overcurrent is occurred from the first rated consuming power source or the second rated consuming power source.

The method for power switching used for saving chip power-consumption further comprises: transmitting a control signal to stop providing a power source or a current from the second rated consuming power source when currents from the first and second rate consuming power sources are simultaneously provided to the operation circuit and the overcurrent is occurred from the first rated consuming power source or the second rated consuming power source.

The regulator may comprises an operational amplifier, a resistor and a driving transistor. The method for power switching used for saving chip power-consumption further comprises: a end of the operational amplifier receives a fixed voltage source, and a current driven by the driving transistor is controlled by output end of the operational amplifier for generating a voltage from the resistor as the first steady voltage or the second steady voltage when the operational amplifier is virtually shorted.

The method for power switching used for saving chip power-consumption further comprises: the sense transistor detects gate voltage of a transistor in the regulator, and a voltage is obtained when a current driven by the sense transistor flows through a resistor, and thus the voltage is compared with a reference voltage for determining whether there is overcurrent.

Figure 3:
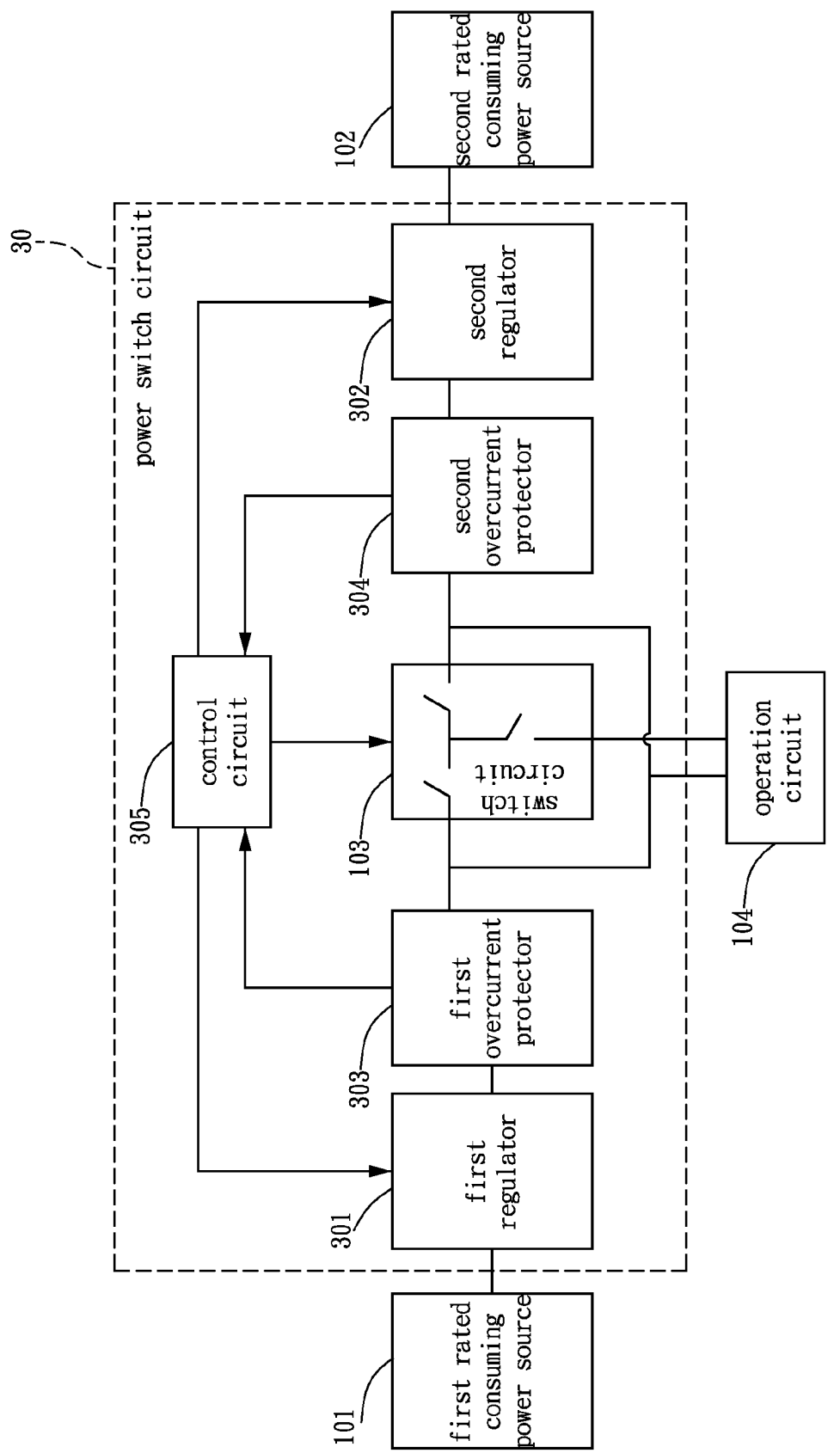
FIG. 3 illustrates a schematic diagram of power switching circuit with protection according to one embodiment of the preset invention.

FIG. 3 illustrates one embodiment of the power switch circuit 105 in the FIG. 1, which discloses a seamless power switch circuit 30. The seamless power switch circuit 30 may switch the rated consuming power sources to save power consumed on the operation circuit 104 according to power consuming requirement of the operation circuit 104. The seamless power switch circuit 30 includes a first regulator 301, for receiving a first rated consuming power source so as to provide a first steady voltage to the operation circuit 104 (or the chip); a second regulator 302, for receiving a second rated consuming power source so as to provide a second steady voltage to the operation circuit 104 (or the chip); a first overcurrent protector 303, coupled to the first regulator, for detecting a output current from the first regulator, and outputting a first control signal when the output current is larger than a first threshold value; a second overcurrent protector 304, coupled to the second regulator, for detecting a output current from the second regulator, and outputting a second control signal when the output current is larger than a second threshold value; and a control circuit 305, for receiving the first and second control signals and feeding back the first and second control signal to prevent the overcurrent generated from the first regulator and the second regulator.

When the first or second rated consuming power source is provided to the operation circuit and a first or a second current from the first or second rated consuming power sources to the operation circuit is smaller than a threshold value, a first or second control signal is transmitted to drive the first rated consuming power source 101 and the second rated consuming power source 102, or the first regulator 301 and the second regulator 302 to generate more currents so as to achieve the seamless process.

In another embodiment, the seamless power switch 300 may be combined with the chip, and it will be discussed herein.

Figure 4:
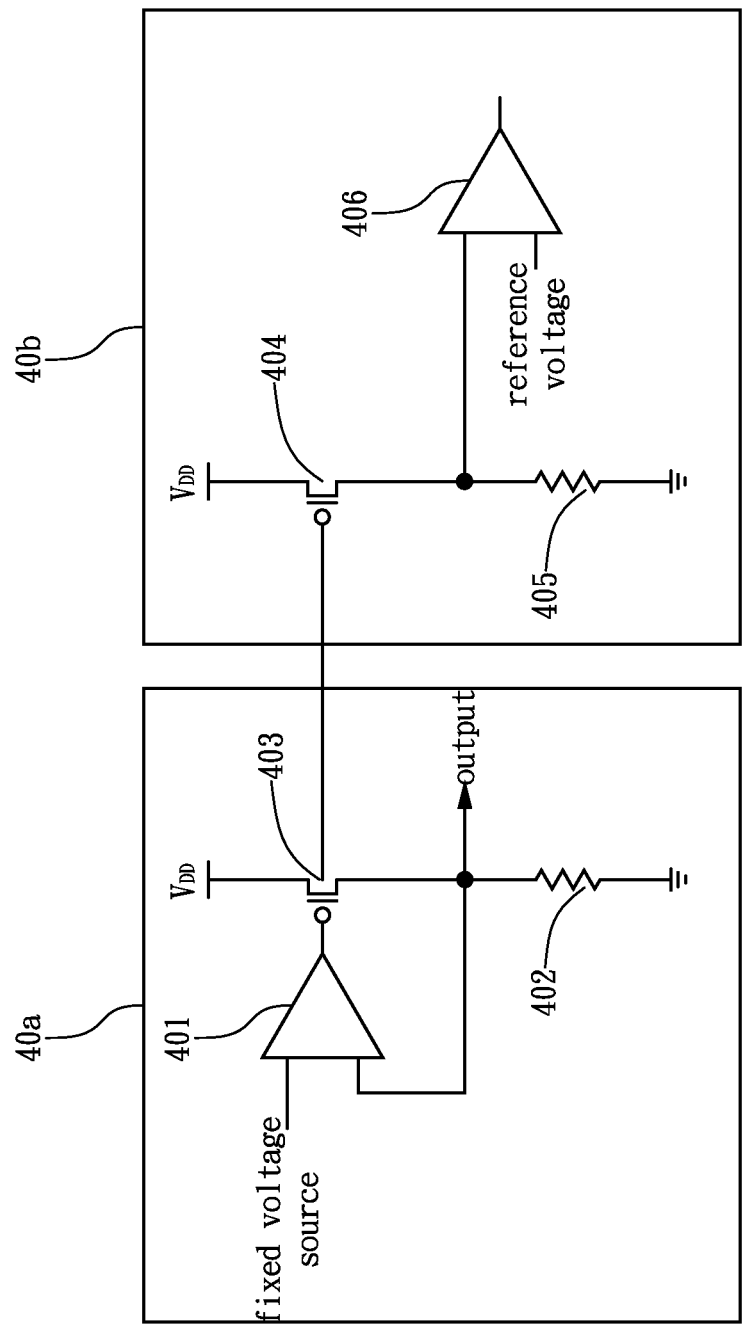
FIG. 4 illustrates a regulator and an overcurrent protector according to one embodiment of the present invention.

FIG. 4 illustrates one embodiment of the regulator and overcurrent protector in FIG. 3. The Vdd in FIG. 4 is the first rated consuming power source 101 or the second rated consuming power source 102. This also means the first rated consuming power source 101 or the second rated consuming power source 102 provide the power to the regulator 40a or the overcurrent protector 40b. The LDO regulator 40a located left side in FIG. 4 includes a operational amplifier 401, a resistor 402 and a driving transistor 403, and wherein a end of the operational amplifier 401 receives a fixed voltage source, and a current driven by the driving transistor 403 is controlled by out end of the operational amplifier 401 for generating a voltage from the resistor 402 as the first steady voltage or the second steady voltage when the operational amplifier 401 is virtually shorted. Specifically, the first steady voltage or the second steady voltage is coupled to the switch circuit 103.

The overcurrent protector 40b located right side in FIG. 4 comprises a sense transistor 404, a sense resistor 405 and a comparing unit 406. A large current is also generated on the sense transistor 404 so as to change the sense voltage on the resistor 405 when the driving transistor 403 drives an overcurrent. The comparing unit 406 compares the sense voltage with a reference voltage, and then transmits the first or second control signal to avoid generating the overcurrent on the regulator 40a or avoid the overcurrent of the regulator 40a flowing to the chip via a switch.

The first or second control signal is used for controlling the first switch 103a, the second switch 103b and the third switch 103c in the FIG. 1 to avoid to damage the first rated consuming power source 101, the second rated consuming power source 102 or the elements of the chip based on voltage level of the bias source difference or transient response when the bias sources are alternately switched. Moreover, the first or second control signal may control the output of the LDO regulator 40a (for example, the gate of the driving transistor 403) in FIG. 4 to decrease the output current.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for power switching, comprising:
   providing an operation circuit;
   receiving an instruction from a Host and setting up a power mode of the operation circuit;
   supplying a first rated consuming power source first and then supplying a second rated consuming power source to the operation circuit via a power switching circuit according to the power mode;
   detecting a process of switching the first rated consuming power source to the second rated consuming power source for generating a detecting result; and
   transmitting a control signal to stop providing a current from the first rated consuming power source or the second rated consuming power source when the detecting result shows currents from the first and second rated consuming power sources are simultaneously provided to the operation circuit and overcurrent is occurred.

2. The method as recited in claim 1, wherein, in the step of supplying the first rated consuming power source first and then supplying the second rated consuming power source to the operation circuit via the power switching circuit according to the power mode, a power switching from the first rated consuming power source to the second rated consuming power source is seamless.

3. The method as recited in claim 1, further comprising:
   transmitting a control signal to stop providing a current from the first rated consuming power source when the overcurrent is occurred from the first rated consuming power source.

4. The method as recited in claim 1, further comprising:
   transmitting a control signal to stop providing a current from the second rated consuming power source when the overcurrent is occurred from the second rated consuming power source.

5. The method as recited in claim 1, further comprising:
   transmitting a first or second controlling signal to generate a current from the first rated consuming power source or the second rated consuming power source when a first current from the first rated consuming power source and a second current from the second rated consuming power source to the operation circuit are both smaller than a threshold value.

6. A power switching circuit configured to switch consuming power source of a operation circuit, comprising:
 a first regulator, for receiving a first rated consuming power source so as to provide a first steady voltage to the operation circuit;
 a second regulator, for receiving a second rated consuming power source so as to provide a second steady voltage to the operation circuit;
 a first overcurrent protector, coupled to the first regulator, for detecting a first output current from the first regulator, and outputting a first control signal when the first output current is larger than a first threshold value;
 a second overcurrent protector, coupled to the second regulator, for detecting an second output current from the second regulator, and outputting a second control signal when the second output current is larger than a second threshold value; and
 a control circuit, for receiving the first and second control signals and feeding back the first and second control signals to prevent a overcurrent generated from the first regulator and the second regulator.

7. The power switching circuit as recited in claim 6, wherein the power switching circuit receives an instruction to switch the consuming power source of the operation circuit from the first rated consuming power source to the second rated consuming power source, and this switching process is seamless.

8. The power switching circuit as recited in claim 6, wherein the first regulator comprises a operational amplifier, a resistor and a driving transistor, and wherein a end of the operational amplifier receives a fixed voltage source, and a current driven by the driving transistor is controlled by output end of the operational amplifier for generating a voltage from the resistor as the first steady voltage or the second steady voltage when the operational amplifier is virtually shorted.

9. The power switching circuit as recited in claim 6, wherein the power switching circuit is combined with the operation circuit.

10. The power switching circuit as recited in claim 6, wherein the first overcurrent protector comprises a sense transistor, a sense resistor and a comparing unit, and wherein the sense transistor detects gate voltage of a transistor in the regulator, and a voltage is obtained when a current driven by the sense transistor flows through a resistor, and thus the voltage is compared with a reference voltage for determining whether there is overcurrent.

* * * * *